3,473,188
JOINT CONSTRUCTIONS FOR
SPECTACLE FRAMES
Francis Owen Wheway, 63 Knowlewood Road,
Dorridge, Solihull, England
Filed May 31, 1967, Ser. No. 642,451
Int. Cl. G02c 5/22
U.S. Cl. 16—128                                           4 Claims

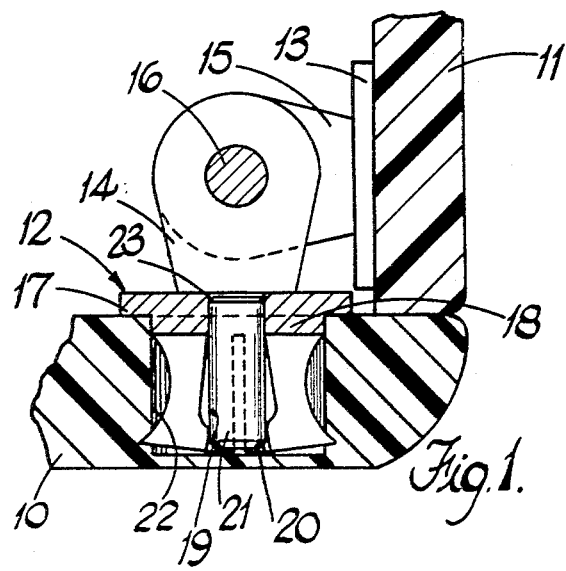
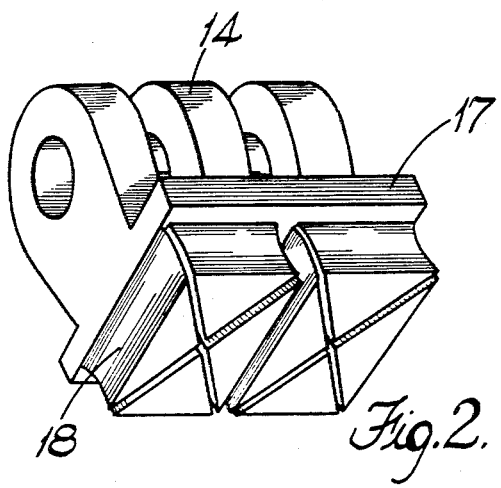

ABSTRACT OF THE DISCLOSURE

A spectacle frame joint comprising a member having a skirt portion, the latter being slidable within a bore in one part of the spectacle frame, and a pin which is engageable within a bore in the body and skirt portion and which acts on a taper in the bore to expand the skirt portion thereby to retain the joint relative to the frame.

---

This invention relates to joint construction for joining the front and side portions of spectacle frames, the object being to provide such a construction in a convenient form.

In accordance with the present invention, a joint construction for a spectacle frame comprises a hollow member which has a longitudinally divided skirt portion at one end, the hollow member being engageable in a blind hole in a portion of the spectacle frame with the skirt portion innermost, the interior of at least part of the skirt portion of the hollow member being tapered, the smaller end of the taper being nearer to the free end of the skirt portion, and a pin engageable in the interior of the member to spread the skirt portion of the member so that as the pin engages the taper in the hollow member, the skirt portion will grip the wall of the hole in said portion of the spectacle frame.

The invention will now be described with reference to the accompanying drawing, FIGURE 1 of which is a cross-sectional view of one example of a spectacle frame joint in accordance with this invention and FIGURE 2 a perspective view of part of a modified joint.

With reference to FIGURE 1 a front portion 10 of a spectacle frame is connected to a side portion 11 thereof by means of a hollow member 12 secured, as will be described, in the front portion 10, and by a part 13 which is connected in conventional manner such as by riveting, to the side portion 11 of the frame. The hollow member 12 has in this example, at least two spaced parallel lugs 14 engageable with one or more similar lugs 15 on the part 13 through a hinge pin 16.

The hollow member 12 is of circular transverse cross-section and has a shallow head 17 and a skirt portion 18. The skirt portion has an external annular groove, and in the head and skirt portion is a central stepped bore 19 having a tapered portion 20 within the skirt portion 18 and near the end remote from the head 17.

The skirt portion 18 is longitudinally divided to provide four segmental portions, and the outwardly presented free edges of these, at the end of the skirt portion 18 remote from the head 17, present a discontinuous sharp angular edge.

Into the bore 19 is driven a pin 21 which upon engagement with the tapered portion 20 spreads the segmental portions of the skirt portion 18 of the hollow member 12 so that the edges thereof become embedded in and grip the wall of a blind hole 22 formed in the front portion 10 of the spectacle frame. In order to retain the pin 21 in its assembled position in the bore 19 the material at the edge of the bore in the head 17 is peened over the end of the pin 21 as indicated at 23.

It is to be understood that the invention can be modified in certain respects, and in particular, the hollow member 12 may carry a pair of spaced pins which engage with a conventional hinge for a spectacle joint, the lugs 14 in this case being formed upon the hinge instead of upon the hollow member 12. The configuration of the exterior surface of the hollow member 12 may be modified as desired, and the skirt portion may be split any convenient number of times to provide a larger or smaller number of portions arranged to spread outwardly, the number of splits being determined by the material of the front portion of the frame with which it is to be used.

It will be appreciated that when the portions of the skirt portion are spaced by insertion of the pin 19 they define a non-circular shape so that angular movement of the joint upon the front portion 10 of the frame is prevented. It will be appreciated however that the skirt portion may be of any convenient noncircular form and one such shape is shown in FIGURE 2 where the skirt portion is rectangular.

Moreover, also as shown in FIGURE 2 two skirt portions may be provided in side by side relationship and in this construction a pair of pins 21 are required to expand the skirt portions respectively. Such an arrangement is particularly useful for heavy duty spectacle frames.

Furthermore particularly in the case when a single skirt portion is provided the exterior surfaces thereof may be knurled.

Having thus described my invention what I claim as new and desire to secure by Letters Patent is:

1. A joint construction for a spectacle frame comprising a member which has a longitudinally divided skirt portion at one end, the member being engageable in a blind hole in a portion of the spectacle frame with the skirt portion innermost, the interior of at least part of the skirt portion of the member being tapered, the smaller end of the taper being nearer to the free end of the skirt portion, and a pin engageable in the interior of the member to spread the skirt portion so that as the pin engages the taper in the member, the skirt portion will grip the wall of the hole in said portion of the spectacle frame.

2. A joint construction as claimed in claim 1 in which the skirt portion is of non-circular external shape.

3. A joint construction as claimed in claim 1 in which the member carries means for connecting it to a part secured on another portion of the spectacle frame.

4. A joint construction as claimed in claim 1 in which the pin is retained in its assembled position by peening over the material of the member at the open end of a bore therein which receives the pin.

References Cited

UNITED STATES PATENTS 3,104,416  9/1963  Barker _____ 16—140
3,386,790  6/1968  McCulloch _____ 16—128 XR CASMIR A. NUNBERG, Primary Examiner DORIS L. TROUTMAN, Assistant Examiner U.S. Cl. X.R.

16—136